United States Patent [19]

Stead et al.

[11] Patent Number: 5,352,256
[45] Date of Patent: Oct. 4, 1994

[54] AIR INTAKE PROTECTION DEVICE

[76] Inventors: Ronald D. Stead, 2071 Oak Terrace, P.O. Box 614, Ortonville, Mich. 48462; Craig M. Blackmer, 213 E. Lakeview, Flint, Mich. 48503

[21] Appl. No.: 118,503
[22] Filed: Sep. 7, 1993
[51] Int. Cl.$^5$ ............................... B01D 46/02
[52] U.S. Cl. ........................ 55/323; 55/337; 55/350.1; 55/419; 55/429; 55/493
[58] Field of Search ............ 55/323, 337, 345, 350.1, 55/394, 418, 419, 429, 483, 493, DIG. 3

[56] References Cited

U.S. PATENT DOCUMENTS

| | | |
|---|---|---|
| 3,508,383 | 4/1970 | Humbert, Jr. et al. . |
| 3,641,745 | 2/1972 | Moore . |
| 3,684,093 | 8/1972 | Kono et al. . |
| 3,771,292 | 11/1973 | Hamilton et al. . |
| 3,898,068 | 8/1975 | McNeil . |
| 3,925,044 | 12/1975 | Tu et al. . |
| 4,070,171 | 1/1978 | Wikdahl . |
| 4,092,130 | 5/1978 | Wikdahl . |
| 4,198,726 | 4/1980 | Powell ............... 55/337 X |
| 4,227,900 | 10/1980 | Nichols et al. . |
| 4,537,608 | 8/1985 | Koslow . |
| 4,790,865 | 12/1988 | De Marco ............... 55/337 |
| 4,878,924 | 11/1989 | Yano et al. . |
| 5,108,471 | 4/1992 | Poborsky ............... 55/337 X |
| 5,248,323 | 9/1993 | Stevenson ............... 55/337 X |

Primary Examiner—Charles Hart
Attorney, Agent, or Firm—Harness, Dickey & Pierce

[57] ABSTRACT

An air intake protection device includes a deflector for directing polluted inlet air in a cyclonic motion as it enters a pollution chamber forcing heavier pollutant particles toward the inside wall of the pollution chamber, causing them to fall into a debris collection chamber. Lighter pollutant particles are engaged by a non-planar filter and a second, final filter. Clean, filtered air is thereby forced through a clean air chamber to an air outlet which communicates the clean, filtered air from the device housing.

20 Claims, 2 Drawing Sheets

AIR INTAKE PROTECTION DEVICE

This invention generally relates to air filtration devices, and more particularly to an air filtration device adapted for use as an air intake protection device for engines.

BACKGROUND AND SUMMARY OF THE INVENTION

Traditionally, engine propelled vehicles utilize air filters in their air intake systems. Such conventional filters may, under adverse conditions, become plugged and clogged very easily and quickly, thereby preventing the flow of clean air and resulting in inefficient operation of the engine. Furthermore, such conventional filters allow finer particulate matter to pass through and enter the air intake system of an engine potentially causing serious damage to the engine. As such, these conventional filters have to be cleaned very often resulting in considerable down time for these engine propelled vehicles and do not fully protect the engine from fine particulate matter.

An example of this problem occurs with use of military vehicles in a desert environment wherein the conventional filters found in tanks and helicopters become clogged and plugged with sand quickly and easily. These conventional filters must be removed and cleaned often which is time consuming and expensive.

It is, therefore, a primary object of the present invention to provide an air intake protection device which efficiently and effectively removes particulate matter from the air and allows engines to operate at peak efficiency longer.

It is another object of the present invention to provide a filtration device which is a natural particulate separator. In particular, polluted air is forced through air intake deflector pipes, exiting into a pollution chamber. The air entering the pollution chamber is caused to swirl in a cyclonic motion whereby heavier pollutant particles within the polluted air are forced away from a non-planar filter toward the inside wall of the pollution chamber. These heavier pollutant particles then fall into a debris collection chamber. Lighter pollutant particles are caused to engage the non-planar filter. The cleaner, filtered air then exits this filter and flows through a final filter into a clean air compartment. The cleaner, filtered air is then forced through the clean air compartment and out of a separator housing through air outlet ports.

It is a further object of the present invention to provide an air intake protection device which requires a minimal amount of time and effort to maintain. The debris collection chamber which may contain a substantial amount of particulate matter may be easily accessed, removed, cleaned and returned. The non-planar shaped air filter may also be easily accessed, removed, cleaned and returned to promote efficient and effective operation of the engine. This would require the use of no special tools or skills and could easily be accomplished in the field.

The above is only one example, and an air intake protection device in accordance with the present invention may have many varied uses, These and other objects of the invention, as well as the advantages thereof over the existing prior art forms, will become apparent from the following brief description of the attached drawings and are accomplished by means hereinafter described and claimed.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
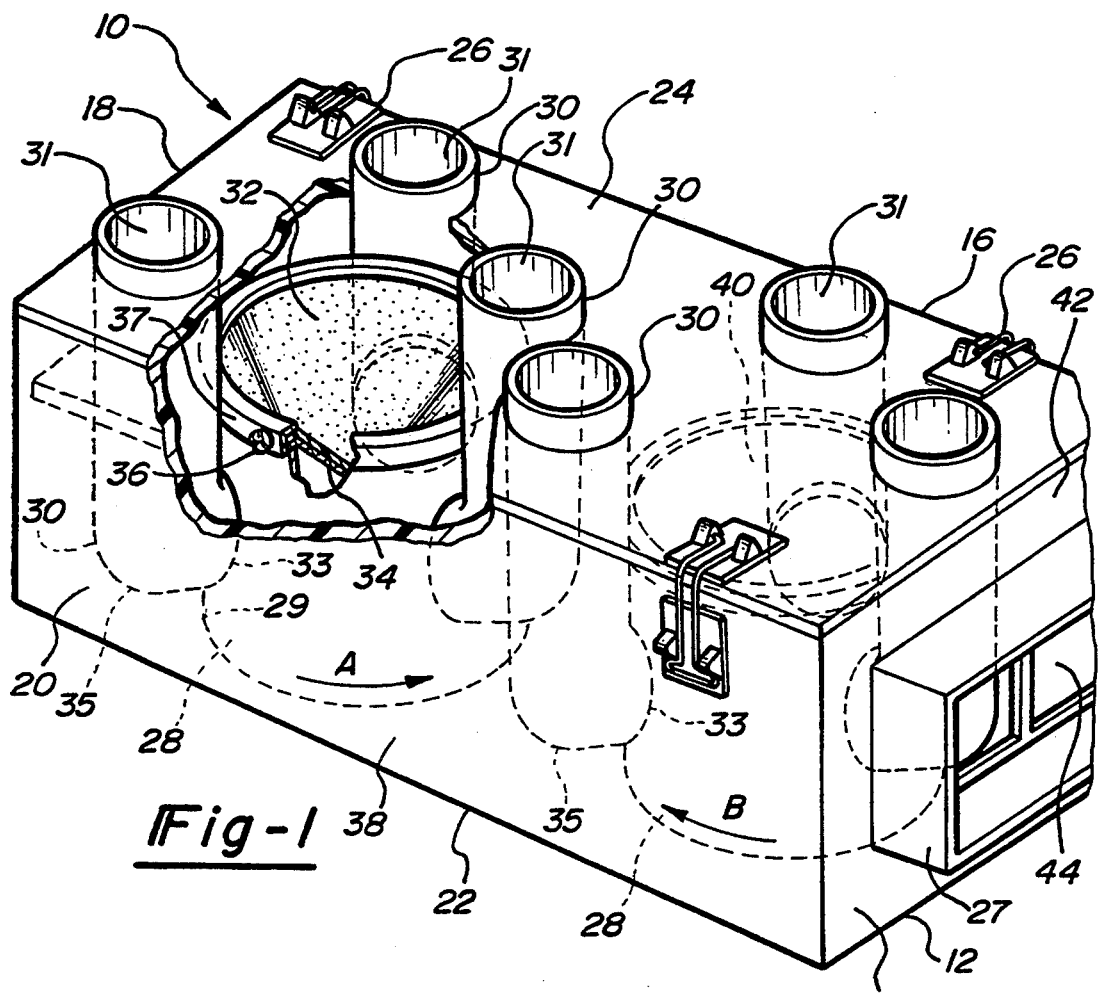
FIG. 1 is a perspective view of an air intake protection device arranged in accordance with a preferred embodiment of the present invention.

Referring now to the drawings, there is depicted an air filtration device embodying the concept of the present invention. The air intake protection device 10 is provided in a housing 12. The housing may have four side walls 14, 16, 18, 20, a floor 22 and a ceiling 24. The floor 22 and the ceiling 24 may be connected to the four side walls 14, 16, 18, 20 by clamps 26. Clamps 26 may be any suitable attachment which will insure an airtight fit between the components of the housing 12. The housing 12 may be shaped in any suitable manner so as to enclose the various parts contained therein. The shape of the housing may also take into account the various applications to which the air intake protection device 10 may be put. Typically, the housing 12 is box like and positioned within the engine propelled vehicle so as to enable easy access, removability and replacement of the air intake protection device 10 or any of its internal components. The housing 12 further includes suitable attachments 27 for securing it and the air intake protection device 10 within the engine propelled vehicle.

The housing 12 encloses and defines one or more pollution chambers 28. Pollution chamber 28 is cylindrical in shape. The size and number of pollution chambers 28 contained in the housing 12 depends on size constraints and the various applications to which the air intake protection device 10 may be put.

A plurality of air intake deflector pipes 30 as shown in FIG. 1, are bonded to pollution chamber 28 and communicate polluted air into pollution chamber 28. These air intake deflector pipes 30 include an intake end 31 which extends through the ceiling 24 of the housing 12 and an outlet end 33 which extends into the pollution chamber 28. The outlet ends 33 are formed as a curved portion 35 of the air intake deflector pipe 30 and deflect the communicated polluted air into the pollution chamber 28. Accordingly, inlet polluted air is caused to flow in a cyclonic path as it flows through curved portion 35 and exits outlet end 33 of air intake deflector pipes 30 and enters the pollution chamber 28. The cyclonic motion of the polluted air is graphically illustrated in FIG. 1 and FIG. 2 by arrows A and B.

Housed within pollution chamber 28 is a non-planar filter 32. In the preferred embodiment, this non-planar filter 32 is conical in shape. A conical shaped filter allows for a greater amount of surface area exposure and therefore, greater filter utilization. The filter media of this non-planar filter 32 may be one of many commercially available type filters. These types of filters are adapted to remove heavy as well as fine pollutant particles from within the polluted air. This non-planar filter 32 may also be non-flammable, water and tear resistant.

The non-planar filter 32 housed within the pollution chamber 28 is supported by a support basket 34. The support basket 34 is cone shaped or of similar shape as non-planar filter 32 for supporting non-planar filter 32 within pollution chamber 28. Support basket 34 is connected to pollution chamber 28 by threaded fasteners 36 and retaining ring 37. Threaded fasteners 36 and retaining ring 37 may be any suitable attachments which will insure a tight fit but also allow for easy access and removability for cleaning and replacement.

In operation, polluted, atmospheric air is drawn into and forced through the air intake protection device 10 by the internal combustion engine of the engine propelled vehicle. The cyclonic path of this polluted air as it enters the pollution chamber 28 forces heavier pollutant particles within the polluted air away from non-planar filter 32 toward inside wall 29 of pollution chamber 28. These heavier pollutant particles then fall to floor 22 of housing 12. A debris collection chamber 38 is provided and may be located on floor 22 of housing 12 and in communication with pollution chamber 28. Heavier pollutant particles can be collected in debris collection chamber 38 which can be easily accessed, removed, cleaned and replaced.

The polluted air is further forced through non-planar filter 32, whereby lighter, finer pollutant particles are engaged by non-planar filter 32. This less polluted air is then engaged by a second, final filter 40 which removes any remaining particulate matter. This final filter 40 is typically a flat, non-flammable, water and tear resistant filter and may be one of many commercially available types which are adapted to remove fine particulate matter from polluted air. Final filter 40 is located on top of pollution chamber 28 and is in fluid communication with non-planar filter 32.

The clean, particulate free air exits final filter 40 and enters clean air chamber 42. The clean, filtered air is then forced through clean air chamber 42 and out through air outlet 44 which communicates the clean, filtered air from housing 12. Air outlet 44 may consist of one or more air outlet ports.

Figure 2:
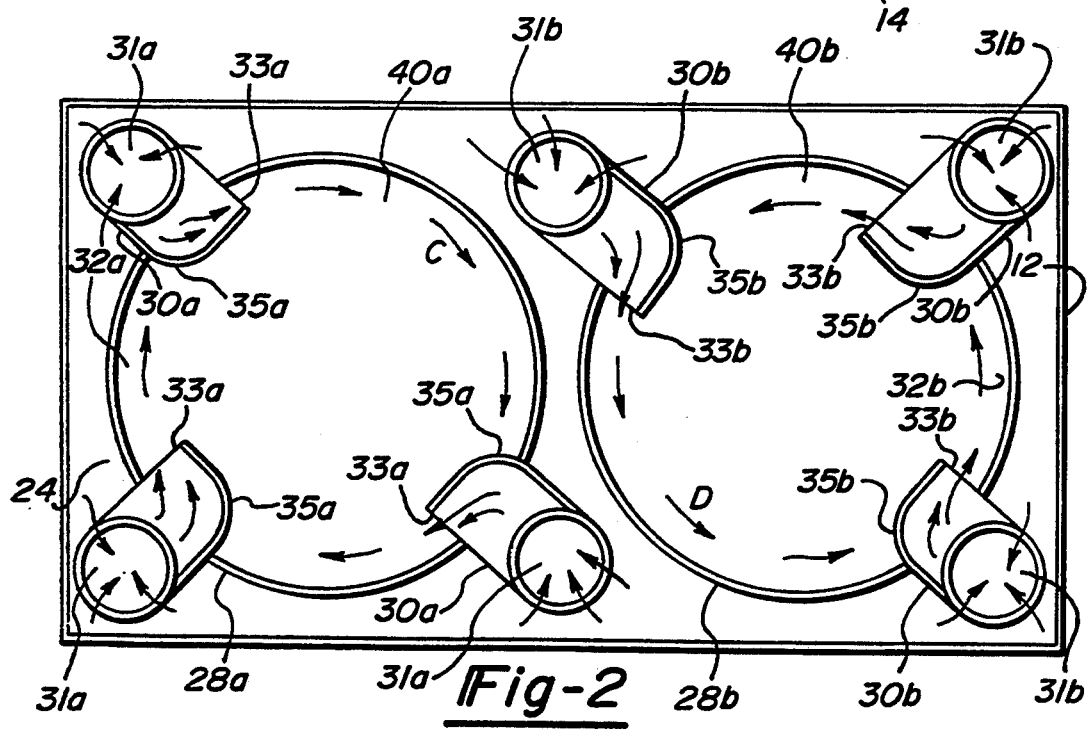
FIG. 2 is a top view of the air intake protection device of FIG. 1.
Figure 3:
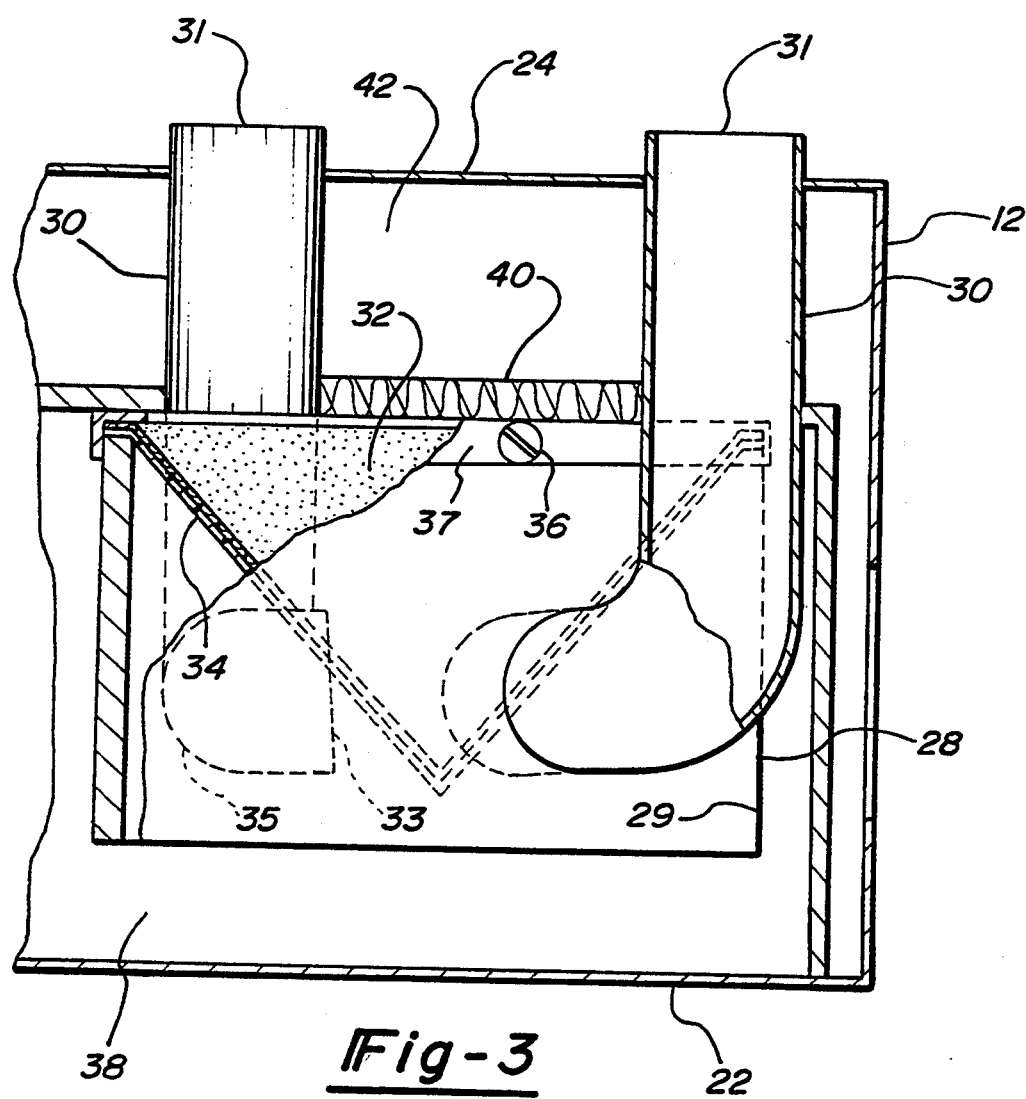
FIG. 3 is a side view of the air intake protection device of FIG. 1 partially broken away and in section.
Figure 4:
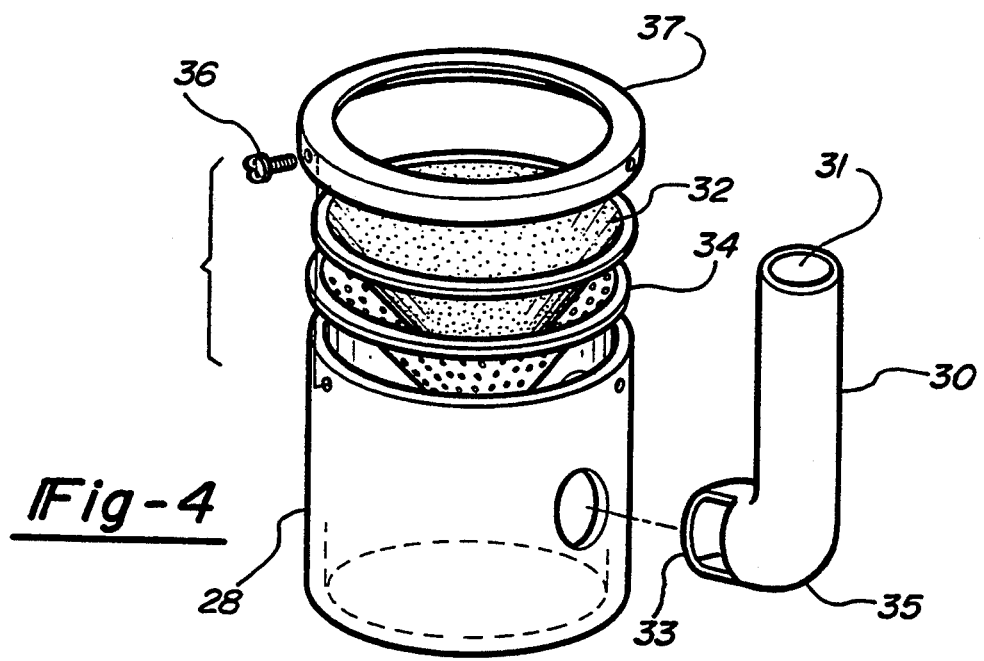
FIG. 4 is a front assembly view of the filter and support basket.

Shown in FIG. 2 is a second embodiment of the present invention wherein the polluted air in adjacent pollution chambers, labeled 28a and 28b respectively, circulates in opposite directions. In this embodiment, a plurality of air intake deflector pipes 30a and 30b, associated with pollution chambers 28a and 28b, respectively are provided for communicating polluted air to pollution chambers 28a and 28b. Intake ends 31a and 31b of air intake deflector pipes 30a and 30b extend through ceiling 24 of housing 12. Air intake deflector pipes 30a and 30b are arranged such that curved portions 35a and 35b of air intake deflector pipes 30a and 30b cause polluted air communicated to pollution chambers 28a and 28b to circulate in opposite cyclonic paths.

In operation, polluted air is forced through air intake deflector pipes 30a and 30b and is communicated to pollution chambers 28a and 28b swirling in opposite cyclonic paths. Polluted air is then forced through non-planar filters 32a and 32b, and final filters 40a and 40b exiting into clean air chamber 42. This clean, filtered air is then forced through clean air chamber 42 and out through air outlet 44 which communicates the clean, filtered air from housing 12. Such an arrangement enhances and promotes the cyclonic motion and action of the polluted air as it enters pollution chambers 28a and 28b, resulting in a more efficient and effective removal of heavy particulate matter, thereby enhancing the performance of the air filtration device. This opposite directions circulation is graphically illustrated in FIG. 2 by arrows C and D.

While the above detailed descriptions describe the preferred embodiment of the present invention, it will be understood that the present invention is susceptible to modification, variation and alteration without deviating from the scope and fair meaning of the subjoined claims.

We claim:

1. An air filtration device comprising:
   a housing defining at least one pollution chamber;
   at least one air intake for communicating polluted air into the pollution chamber;
   an air outlet for communicating filtered air from the housing;
   means for forcing polluted air into the inlet and filtered air from the outlet;
   a non-planar filter disposed within the pollution chamber and between the air inlet and outlet;
   a clean air chamber disposed within the housing and between the non-planar filter and the air outlet;
   a debris collection chamber disposed within the housing and in communication with the pollution chamber;
   deflector means disposed within the pollution chamber for causing the inlet air to be directed in a cyclonic path as it enters the pollution chamber whereby heavier pollutant particles within the polluted air are separated from the polluted air and into the debris collection chamber, and lighter pollutant particles are engaged by the non-planar filter as the polluted air is forced through the non-planar filter.

2. An air filtration device as set forth in claim 1 wherein said air intake comprises an air intake pipe and the deflector means comprises curves formed in said intake pipe.

3. An air filtration device as set forth in claim 2 wherein said air intake further comprises a plurality of air intake pipes.

4. An air filtration device as set forth in claim 3 wherein said air intake pipes are equidistantly spaced.

5. An air filtration device as set forth in claim 1 wherein said pollution chamber is cylindrical in shape.

6. An air filtration device as set forth in claim 1 wherein said non-planar filter further comprises a conical filter.

7. An air filtration device as set forth in claim 1 wherein said non-planar filter is non-flammable, water and tear resistant.

8. An air filtration device as set forth in claim 1 wherein said non-planar filter and said debris collection chamber are removably mounted.

9. An air filtration device as set forth in claim 1 further comprising a second filter located between said non-planar filter and said air outlet.

10. An air filtration device as set forth in claim 9 wherein said second filter is a flat, non-flammable, water and tear resistant filter.

11. An air filtration device comprising:
    a housing defining a plurality of pollution chambers;
    at least one air intake for each pollution chamber for communicating polluted air into the pollution chamber;

an air outlet for communicating filtered air from the housing;

means for forcing polluted air into the inlet and filtered air from the outlet;

a non-planar filter disposed within each pollution chamber and between the air inlet and outlet;

a clean air chamber disposed within the housing and between the non-planar filters and the air outlet;

a debris collection chamber disposed within the housing and in communication with the pollution chambers;

deflector means disposed within each pollution chamber for causing the inlet air to be directed in a cyclonic path as it enters the pollution chamber whereby heavier pollutant particles within the polluted air are separated from the polluted air and into the debris collection chamber, and lighter pollutant particles are engaged by the non-planar filter as the polluted air is forced through the non-planar filter.

12. An air filtration device as set forth in claim 11 wherein said air intake comprises an air intake pipe and the deflector means comprises curves formed in said intake pipe.

13. An air filtration device as set forth in claim 12 wherein said air intake further comprises a plurality of air intake pipes which are equidistantly spaced.

14. An air filtration device as set forth in claim 11 wherein said pollution chambers are cylindrical in shape.

15. An air filtration device as set forth in claim 11 wherein said non-planar filters further comprise conical filters.

16. An air filtration device as set forth in claim 11 wherein said non-planar filters are non-flammable, water and tear resistant.

17. An air filtration device as set forth in claim 11 wherein said non-planar filters and said debris collection chamber are removably mounted, 18. An air filtration device as set forth in claim 11 further comprising a second filter located between said non-planar filters and said air outlet.

19. An air filtration device as set forth in claim 18 wherein said second filter is a flat, non-flammable, water and tear resistant filter.

20. An air filtration device as set forth in claim 11 wherein the air in adjacent pollution chambers circulates in opposite directions.

* * * * *